United States Patent
Rahbar et al.

(10) Patent No.: US 7,687,953 B2
(45) Date of Patent: Mar. 30, 2010

(54) TOTALLY INTEGRATED ENGINE COOLING MODULE FOR D.C. MOTORS EMPLOYING FAN HUB AND SHROUD HUB AS MOTOR COVERS

(75) Inventors: Mehran K. Rahbar, Virginia Beach, VA (US); Marek Horski, London (CA)

(73) Assignee: Brose Fahrzeugteile GmbH & Co. Kommanditgesellschaft, Würzburg, Würzburg (DE)

( * ) Notice: Subject to any disclaimer, the term of this patent is extended or adjusted under 35 U.S.C. 154(b) by 408 days.

(21) Appl. No.: 11/402,864

(22) Filed: Apr. 13, 2006

(65) Prior Publication Data

US 2006/0239838 A1 Oct. 26, 2006

Related U.S. Application Data

(60) Provisional application No. 60/673,532, filed on Apr. 21, 2005.

(51) Int. Cl.
*H02K 5/00* (2006.01)

(52) U.S. Cl. .................. 310/91; 310/238; 310/239; 310/89; 310/11; 123/41.49; 248/49

(58) Field of Classification Search .............. 310/91, 310/154, 238, 239, 11, 47, 58, 89; 123/41.49, 123/41.1, 41.56; 248/49; *H02K 5/00*
See application file for complete search history.

(56) References Cited

U.S. PATENT DOCUMENTS

| 5,216,306 | A | * | 6/1993 | Nakazawa et al. ............. 310/89 |
| 5,952,754 | A | * | 9/1999 | Mok .............................. 310/91 |
| 5,970,925 | A | * | 10/1999 | Lakerdas et al. .......... 123/41.11 |
| 6,058,594 | A | * | 5/2000 | Neumann et al. ............. 29/596 |
| 6,104,110 | A | * | 8/2000 | Uchida et al. ................. 310/51 |
| 6,106,228 | A | * | 8/2000 | Bartlett ....................... 415/146 |
| 6,208,052 | B1 | * | 3/2001 | Kershaw et al. ............... 310/91 |
| 6,227,822 | B1 | * | 5/2001 | Chen ....................... 417/423.7 |
| 6,552,464 | B1 | * | 4/2003 | Rahbar et al. ............... 310/239 |
| 6,554,230 | B1 | * | 4/2003 | Horski ........................ 248/49 |
| 6,625,868 | B2 | * | 9/2003 | Rahbar et al. ................. 29/596 |
| 2002/0047422 | A1 | * | 4/2002 | Tomiyama et al. ..... 310/154.08 |
| 2002/0047466 | A1 | * | 4/2002 | Mademba-Sy ............. 310/238 |
| 2003/0001449 | A1 | * | 1/2003 | Yoshikawa et al. ..... 310/156.45 |
| 2003/0071529 | A1 | * | 4/2003 | Rahbar et al. ............... 310/89 |
| 2004/0046480 | A1 | * | 3/2004 | Takahashi et al. .......... 310/239 |
| 2004/0113504 | A1 | * | 6/2004 | Agnes et al. ........... 310/154.08 |
| 2004/0245886 | A1 | * | 12/2004 | Uchida ....................... 310/239 |
| 2005/0121994 | A1 | * | 6/2005 | Kong et al. ................. 310/239 |

* cited by examiner

*Primary Examiner*—Quyen Leung
*Assistant Examiner*—John K Kim
(74) *Attorney, Agent, or Firm*—Manelli Denison & Selter PLLC; Edward J. Stemberger

(57) ABSTRACT

An engine cooling module includes a shroud structure 12 having a shroud hub 46 constructed and arranged to receive a portion of a motor 16. A DC electric motor 16 has first and second ends and a rotatable shaft 40. The second end of the motor is received by the shroud hub. A fan 70 is provided that has a fan hub 72. The fan is coupled with the shaft for rotation therewith. The shroud hub 46 defines a protective cover covering the second end of the motor, and the fan hub 70 defines a protective cover covering the first end of the motor. Thus, no motor housing is required.

12 Claims, 8 Drawing Sheets

TOTALLY INTEGRATED ENGINE COOLING MODULE FOR D.C. MOTORS EMPLOYING FAN HUB AND SHROUD HUB AS MOTOR COVERS

This application is based on U.S. Provisional Application No. 60/673,532, filed on Apr. 21, 2005 and claims the benefit thereof for priority purposes.

FIELD OF THE INVENTION

This invention relates engine cooling modules for automotive applications and, more particularly, to a cooling module having fewer parts and thereby easier to manufacture and assemble.

BACKGROUND OF THE INVENTION

Typical cooling modules for vehicle engines generally include three separate parts: a fan, an electric motor to drive the fan, and a shroud to cover the blades of the fan and to mount the module. Due to the need for separate parts, many subassemblies need to be performed to complete the final assembly of the module. Further, since the motor is separate from the shroud, the motor requires a case and end caps at both ends thereof, which increases the weight of the module.

In certain applications, due to space and environmental constraints, it is desirable to provide an engine cooling module of reduced axial length and, to reduce costs, having reduced number of module parts.

Accordingly, there is a need to provide an improved cooling module for an electronically controlled engine that has a motor integrated with a fan and a shroud to provide a module having a reduced axial length and fewer parts.

SUMMARY OF THE INVENTION

An object of the invention is to fulfill the need referred to above. In accordance with the principles of the present invention, this objective is achieved by providing an engine cooling module including a shroud structure having a shroud hub constructed and arranged to receive a portion of a motor. A DC electric motor is provided without a motor case. The motor has first and second ends and a rotatable shaft. The second end of the motor is received by the shroud hub. A fan is provided that has a fan hub. The fan is coupled with the shaft for rotation therewith. The shroud hub defines a protective cover covering the second end of the motor, and the fan hub defines a protective cover covering the first end of the motor.

In accordance with another aspect of the invention, a method of providing an engine cooling module provides a shroud structure having a shroud hub. A DC motor, without a motor case, is provided having first and second ends. The motor includes a flux ring defining the second end of the motor. Permanent magnets are coupled to an inner surface of the flux ring. An armature assembly is received in an interior of the flux ring generally adjacent to the magnets. The armature assembly includes a commutator, windings and a shaft. A bracket is mounted to the flux ring and defines the first end of the motor. A brush card assembly is mounted to the bracket. The brush card assembly has brushes associated with the commutator. At least a portion of the motor is placed into the shroud hub such that the flux ring engages the shroud hub with the shroud hub defining a protective cover covering the second end of the motor. A fan is placed onto an end of the shaft. The fan has a fan hub defining a protective cover covering the first end of the motor. The motor and fan are placed uni-directionally during the assembly.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF THE EXEMPLARY EMBODIMENTS

Figure 1:
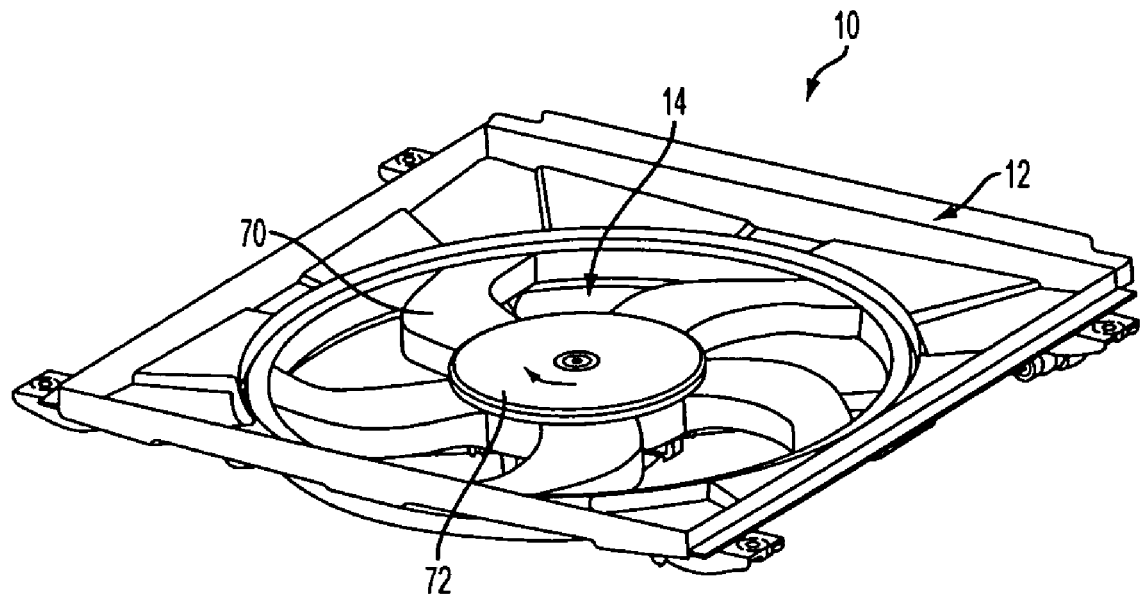
FIG. 1 is a front view of an engine cooling module including a shroud structure and a fan/motor assembly carried by the shroud structure in accordance with the principles of the present invention, showing a fan hub covering an end of a motor.
Figure 2:
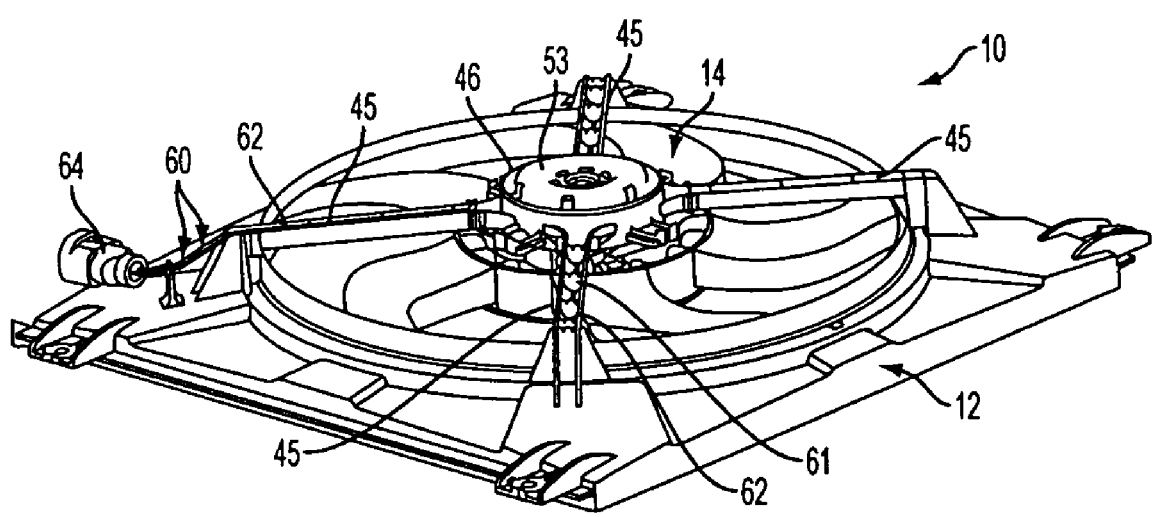
FIG. 2 is a rear view of the engine cooling module of FIG. 1.

With reference to FIG. 1, a front view of an engine cooling module is shown, generally indicated at 10, in accordance with the principles of the present invention. A rear view of the module 10 is shown in FIG. 2. The module 10 includes a shroud structure, generally indicated at 12, and a fan/motor assembly, generally indicated at 14.

Figure 3:
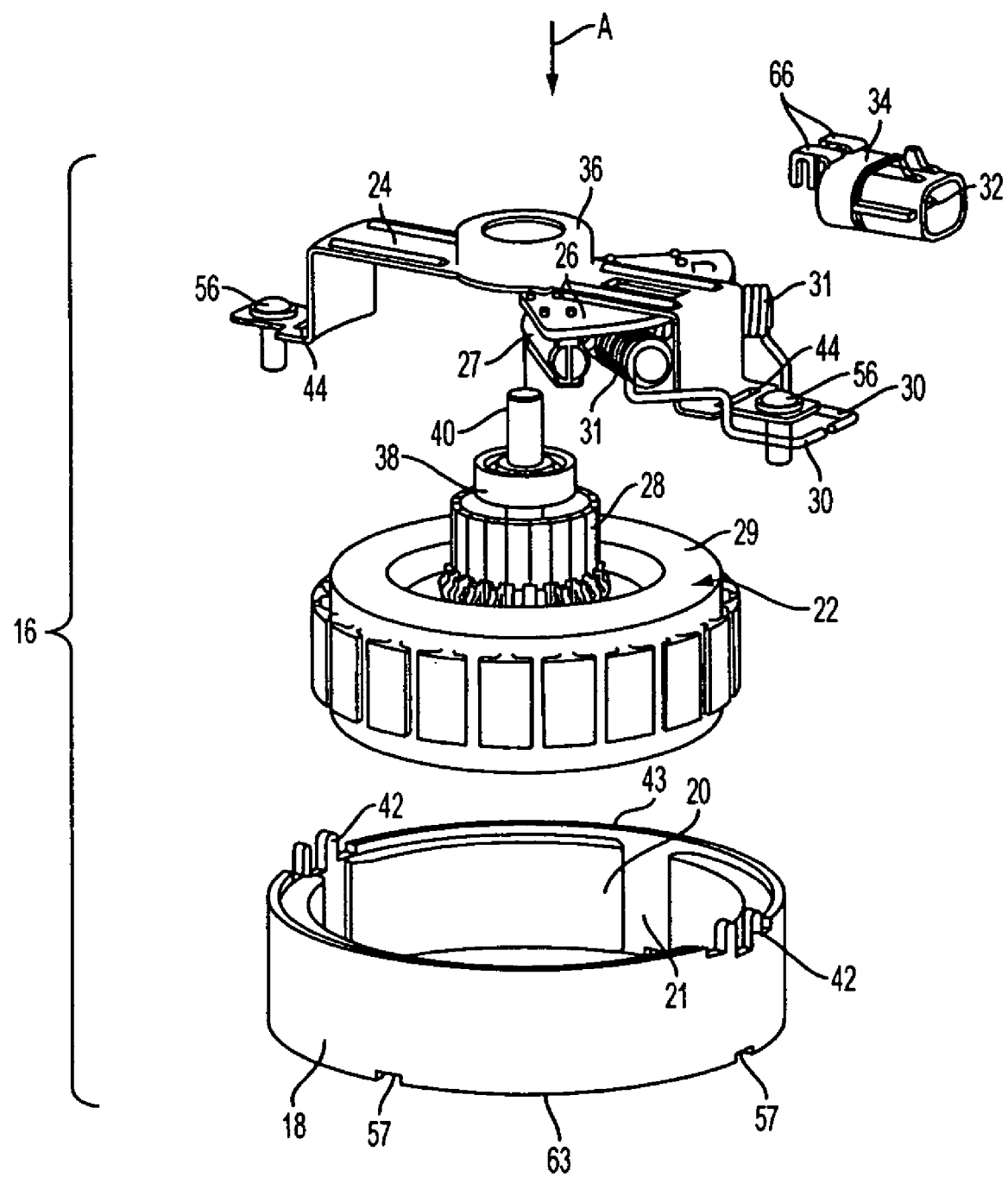
FIG. 3 is an exploded view of a motor of the fan/motor assembly of FIG. 2.

FIG. 3 is an exploded view of the motor 16 of the fan/motor assembly 14 that is assembled in the direction A. The motor 16 lacks a conventional motor case and end caps that generally protect the internal components of the motor. The motor 16 includes a flux ring 18 carrying permanent magnets 20 on inner surface 21 thereof. An armature assembly, generally indicated at 22, is received in the interior of the flux ring 18 so as to be generally adjacent to the magnets 20. The armature assembly 22 includes a conventional commutator 28, windings 29 and shaft 40. A metal bracket 24 is provided that carries a brush card 26. In the embodiment, the brush card includes two brushes 27 fixed thereto that deliver current to the commutator 28 when power is supplied to legs 30 of chokes 31. The legs 30 are electrically connected to the leads 32 of a connector 34, as will be explained more fully below.

The bracket 24 includes a bearing pocket 36 constructed and arranged to receive a bearing 38 that permits the shaft 40 to rotate.

The flux ring 18 includes tabs 42, at a first end 43 thereof, that are received in openings 44 provided in the bracket 24 to fixedly mount the bracket 24 to the flux ring 18. In this case, the motor timing can be monitored by the positioning of the magnets 20 only.

Figure 4:
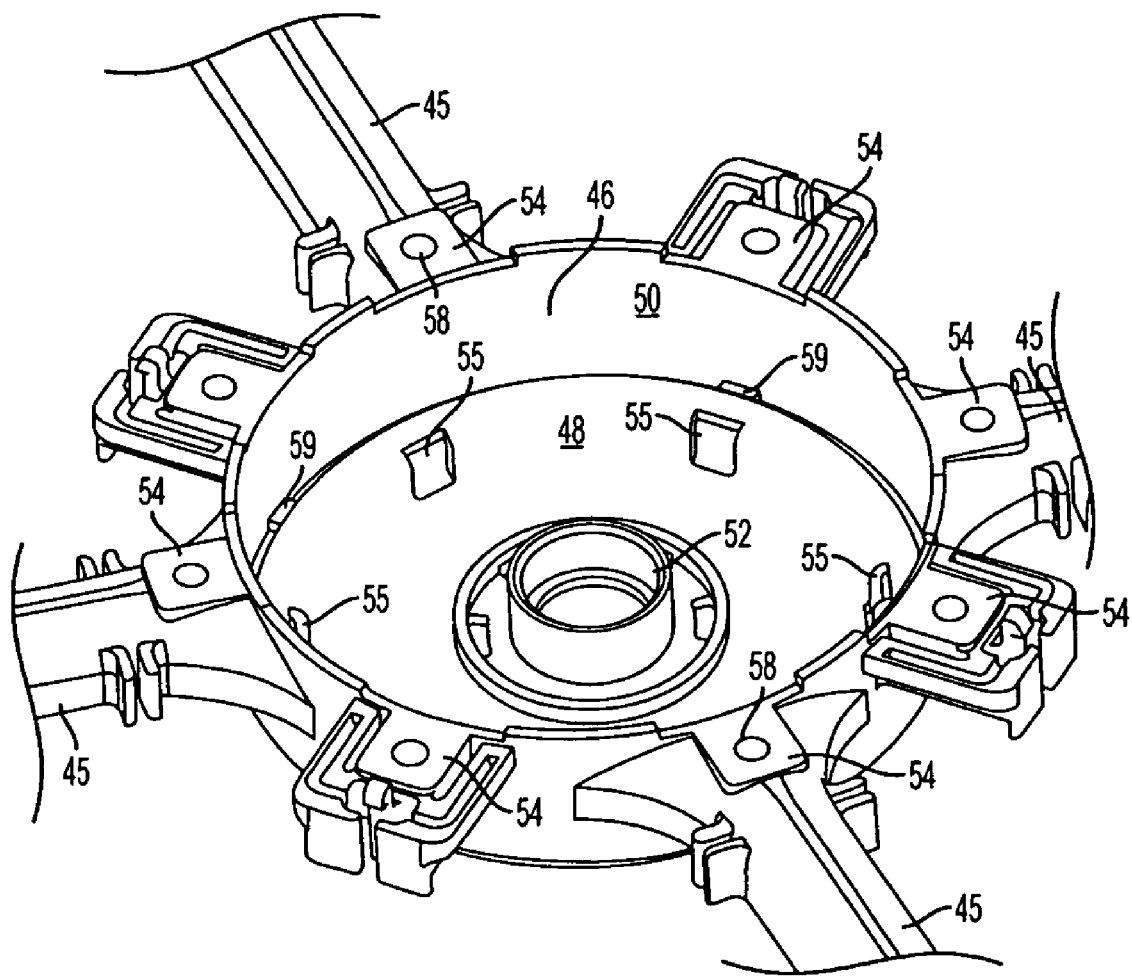
FIG. 4 is an enlarged front view of a portion of the shroud structure having a shroud hub that defines a rear cover for the motor in accordance with the invention.
Figure 5:
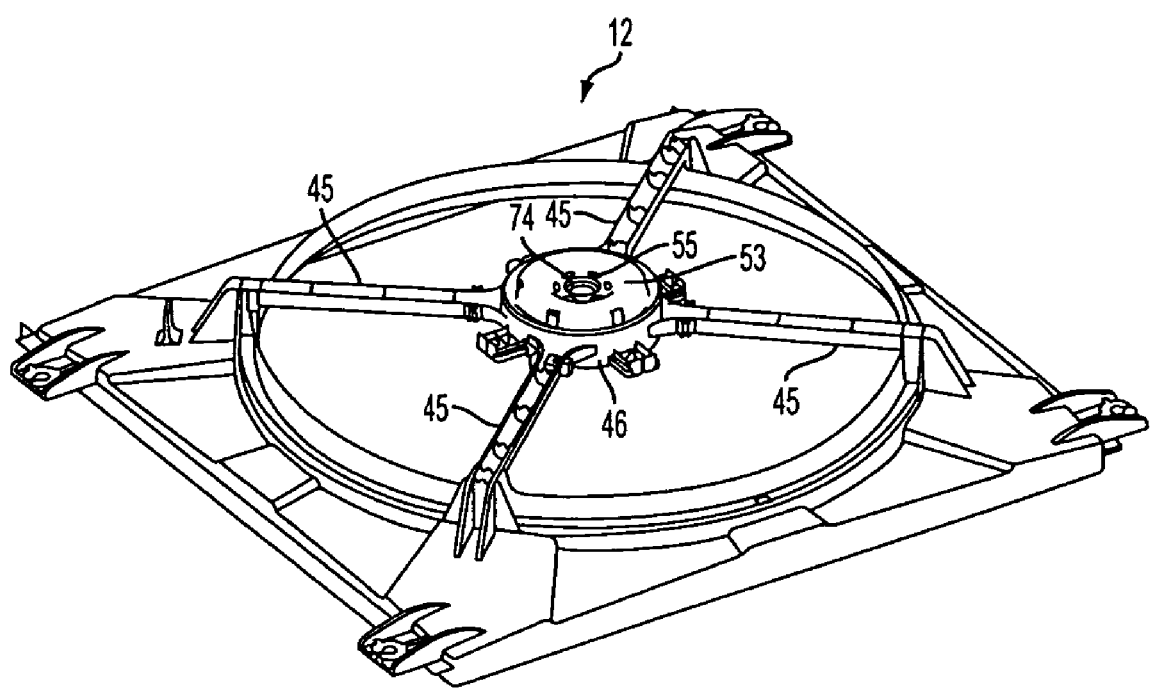
FIG. 5 is a rear view of the shroud structure showing the rear cover for the motor.
Figure 9:
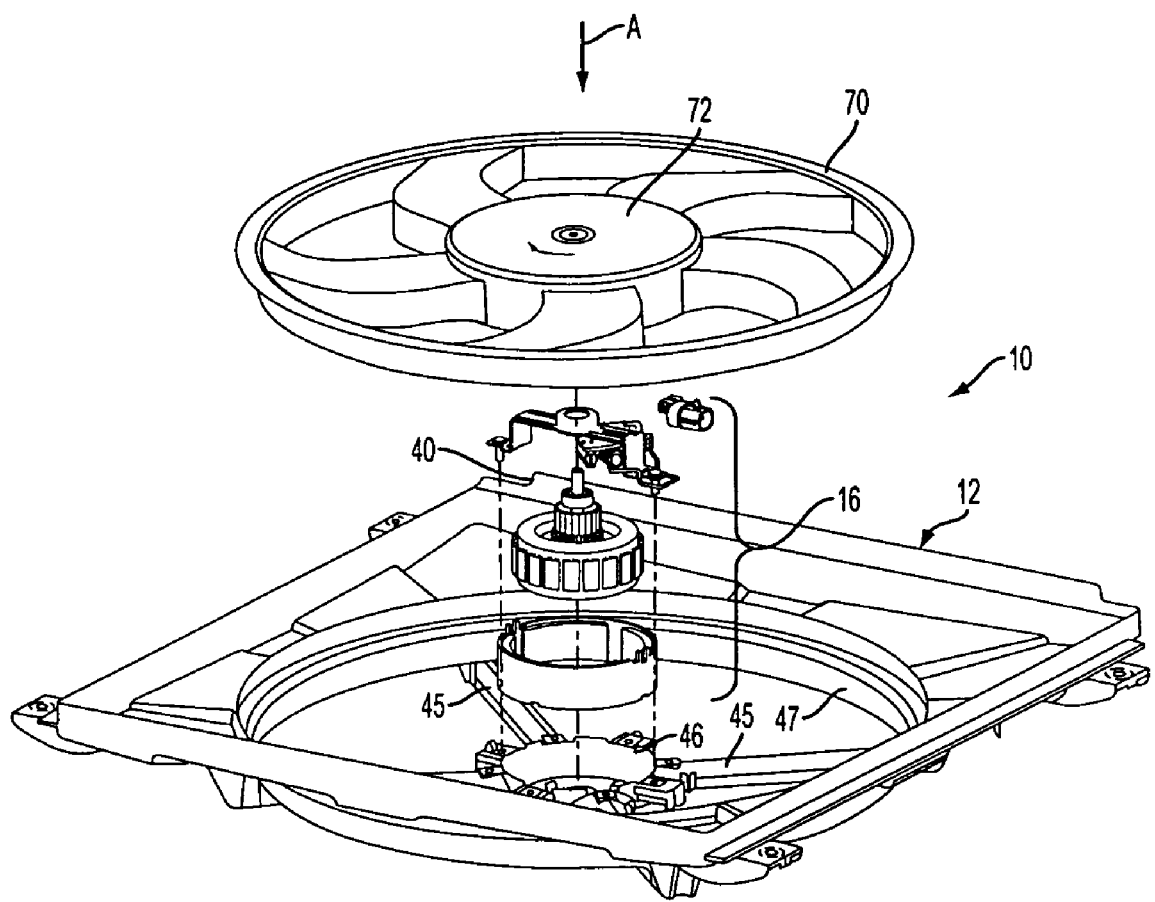
FIG. 9 is an exploded view of the engine cooling module of FIG. 1.

With reference to FIGS. 4 and 9, the shroud structure 12 includes mounting arms 45 that extend from an outer ring 47 to central pocket structure or hub 46. The shroud hub 46 is defined by a surface 48 and an annular wall 50 extending from the surface 48. A rear bearing seat 52 is formed with respect to the surface 48 and receives the rear bearing for the shaft 40 for permitting shaft rotation. FIG. 5 is front view of the shroud structure showing a protective cover 53 (opposite surface 48 of FIG. 4), the function of which will be explained below. Vent holes 55 are provided through the cover 53 to permit airflow for motor cooling.

As shown in FIG. 4, motor mounting tabs 54 extend from the annular wall 50 of the hub 46. In the embodiment, eight equally spaced tabs 54 are provided. Thus, to mount the motor 16, notches 57 (FIG. 3) in the second end 63 of the flux ring 18 are received by shroud mounting posts 59 (FIG. 4) in the hub 46. This arrangement positions the armature core rear bearing into the bearing seat 52 defined in the hub 46. It can be appreciated that the notches 57 can be provided in the hub 46, with the posts 59 provided on the flux ring 18. Next, fasteners 56 (e.g., bolts, screws), associated with bracket 24 and disposed generally 180 degrees apart, are received in bores 58 of preferably two of the mounting tabs 54 that are 180 degrees apart. In this way, the motor 16 can be rotated in relation to the shroud structure 12 to one of eight selectable mounting positions.

Figure 6:
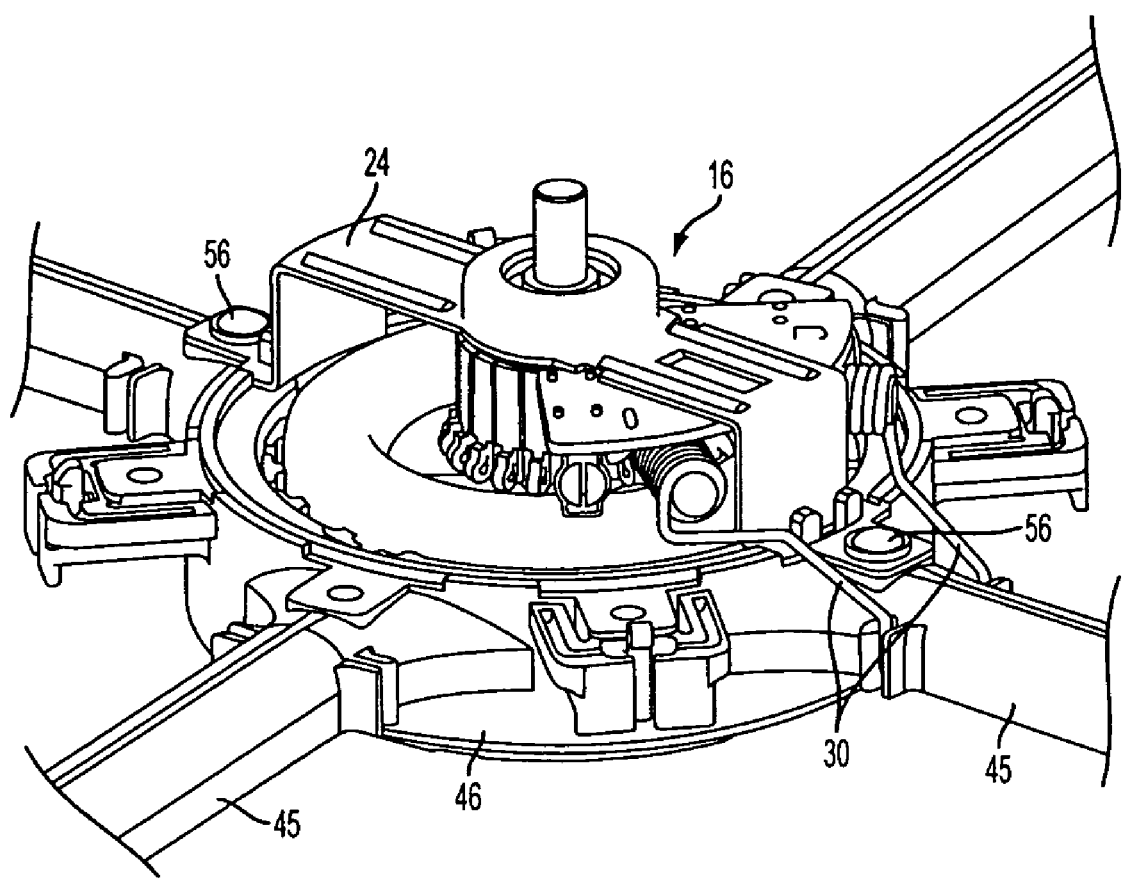
FIG. 6 is a front view of the motor shown mounted to the shroud structure with choke legs extending to a motor mounting arm of the shroud structure.
Figure 7:
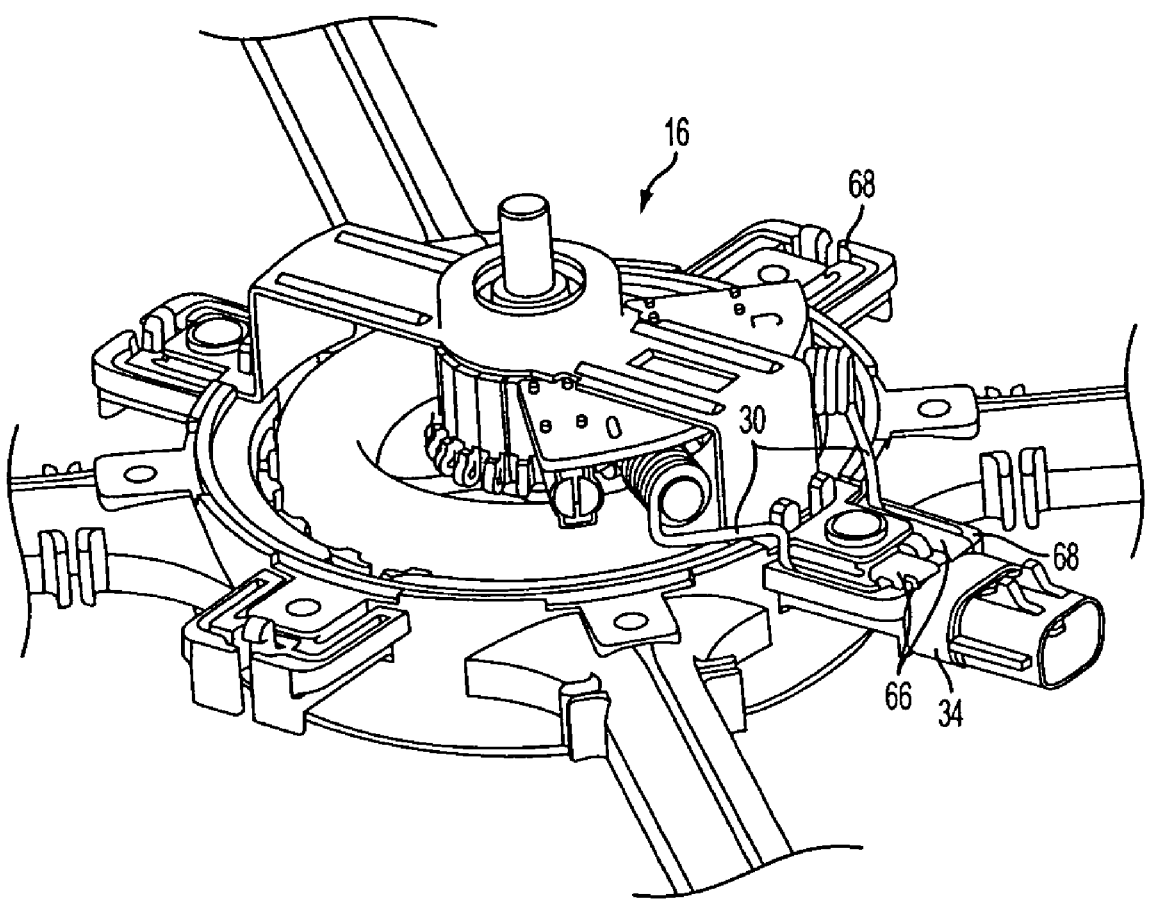
FIG. 7 is a front view of the motor shown mounted to the shroud structure with another embodiment of the choke legs being connected to an integral connector.
Figure 8:
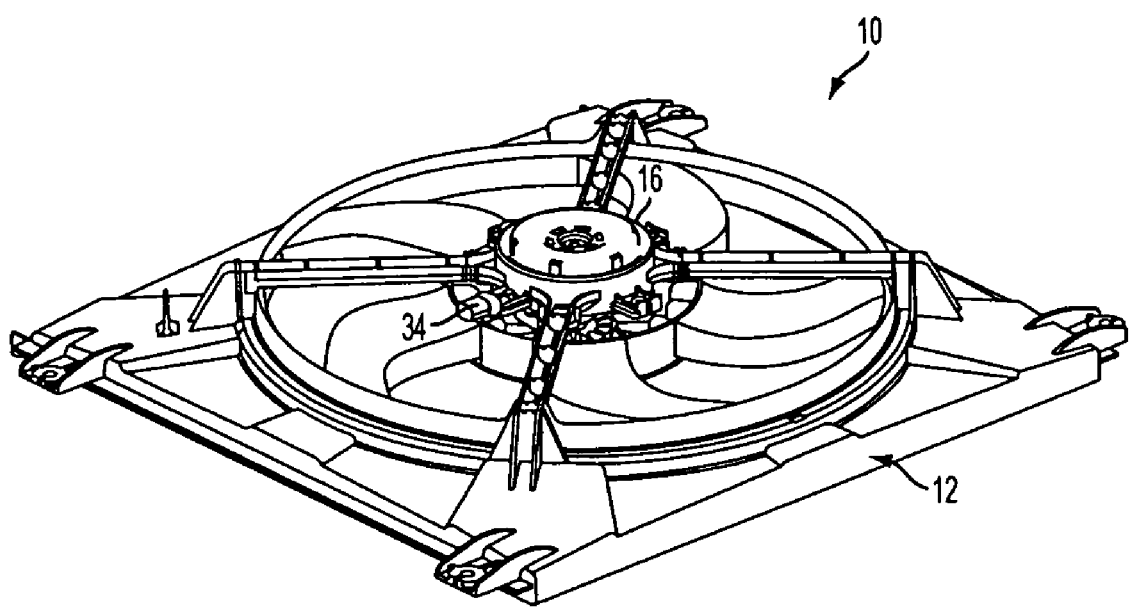
FIG. 8 is a front view of the cooling module showing the typical location of the integral connector of FIG. 7.

FIG. 6 shows the motor 16 mounted to the shroud structure 12 via the two fasteners 56. The choke legs 30 are extended to one of the arms 45 and, with reference to FIG. 2, are connected with wires, generally indicated at 60, that are secured in notched supports 61 provided in a channel 62 on the underside of the arm 45. The wires 60 are connected with power leads of an electrical connector 64 which can be mounted anywhere on a surface of the shroud structure 12. Alternatively, as shown in FIGS. 3 and 7, the legs 30 of the chokes can be coupled directly with the connector 34. The connector 34 includes clips 66 that engage clip receiving structure 68 that is integral with the shroud structure 12. FIG. 8 shows one location of the connector 34 mounted with respect to the module 10.

FIG. 9 is an exploded view of the module 10 showing the motor 16 being assembled in direction A with respect to the shroud structure 12 and a fan 70 being mounted to the shaft 40 of the motor 16. Thus, with reference to FIG. 1, the fan hub 72 provides a protective cover over the front side of the motor 16 and with reference to FIG. 2, the surface 53 of the shroud structure hub 46 provides a protective cover over the rear portion of the motor 16 so as to reduce the number of parts of the module 10. Namely, a motor case and end caps are totally eliminated.

The embodiments allow for unidirectional assembly (arrow A in FIGS. 3 and 9) including the assembly of the fan 70. An opening 74 (FIG. 5) is provided in the rear cover 54 to provide shaft support during assembly.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. An engine cooling module comprising:
   a shroud structure having a shroud hub constructed and arranged to receive a portion of a motor,
   a DC electric motor absent a motor case, the motor having first and second ends, a rotatable shaft, and a flux ring separate from the shroud hub and defining the second end of the motor being received by the shroud hub, and
   a fan having a fan hub, the fan being coupled with the shaft for rotation therewith,
   the shroud hub defining a protective cover covering the second end of the motor, and the fan hub defining a protective cover covering the first end of the motor.

2. The module of claim 1, wherein:
   the flux ring has first and second ends and inner surface defining an interior and an outer surface defining an exterior, the second end of the flux ring being received in the shroud hub with the outer surface being directly adjacent to an interior surface of the shroud hub, the motor further comprising:
   permanent magnets coupled to inner surface of the flux ring,
   an armature assembly received in the interior of the flux ring generally adjacent to the magnets, the armature assembly including a commutator, windings and a shaft,
   a bracket mounted to the flux ring, and
   a brush card assembly mounted to the bracket, the brush card assembly having brushes associated with the commutator.

3. The module of claim 2, wherein the first end of the flux ring includes tabs and the bracket includes surfaces defining openings therein, the tabs being received in the openings thereby mounting the bracket to the flux ring.

4. The module of claim 2, wherein the second end of the flux ring includes notches therein and the shroud hub includes posts associated therewith, the posts being received in the notches to position the motor with respect to the shroud hub.

5. The module of claim 2, wherein the shroud structure includes a plurality of mounting tabs extending from the shroud hub, at least two fasteners being associated with the bracket, the fasteners being coupled with certain of the mounting tabs to mount the bracket to the shroud structure.

6. The module of claim 5, wherein the shroud hub has an annular wall with eight generally equally spaced mounting tabs extending from the annular wall, the at least two fasteners associated with the bracket being disposed generally 180 degrees apart and the certain mounting tabs being a pair of mounting tabs disposed generally 180 degrees apart.

7. The module of claim 2, wherein the bracket includes a bearing pocket receiving a bearing associated with an end of the shaft.

8. The module of claim 7, wherein the shroud hub includes a bearing seat receiving a bearing associated with another end of the shaft.

9. The module of claim 2, wherein the shroud structure includes mounting arms extending from an outer ring to the shroud hub, and wherein chokes are associated with the brushes, the chokes having legs with certain legs being electrically connected with power leads.

10. The module of claim 9, wherein at least one mounting arm includes a channel therein, the certain legs of the chokes extending to the at least one mounting arm, the module further comprising wires electrically connected with the certain legs of the chokes, the wires being disposed in the channel, the power leads being associated with a connector mounted to the shroud structure, ends of the wires being electrically connected with the power leads.

11. The module of claim 9, wherein the certain legs are directly connected with the power leads generally adjacent to the bracket.

12. The module of claim 1, wherein the shroud hub includes surfaces defining vent holes there-through.

* * * * *